US012699515B2

(12) United States Patent
Cheng

(10) Patent No.: US 12,699,515 B2
(45) Date of Patent: Aug. 4, 2026

(54) MEMORY SYSTEM, OPERATION METHOD, AND ELECTRONIC APPARATUS

(71) Applicant: Yangtze Memory Technologies Co., Ltd., Wuhan (CN)

(72) Inventor: Mo Cheng, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/399,467

(22) Filed: Dec. 28, 2023

(65) Prior Publication Data

US 2025/0077078 A1     Mar. 6, 2025

(30) Foreign Application Priority Data

Aug. 29, 2023     (CN) .......................... 202311105073.2

(51) Int. Cl.
G06F 12/00          (2006.01)
G06F 3/06           (2006.01)
(52) U.S. Cl.
CPC .......... G06F 3/0613 (2013.01); G06F 3/0659 (2013.01); G06F 3/0679 (2013.01)
(58) Field of Classification Search
CPC .... G06F 3/0613; G06F 3/0659; G06F 3/0679; G06F 12/02; G06F 12/084; G06F 12/0246; G06F 2212/1032; G06F 2212/2022; G06F 2212/601; G06F 2212/7204; G06F 2212/7205; G06F 2212/7206; G06F 2212/7211
See application file for complete search history.

(56) References Cited

U.S. PATENT DOCUMENTS

| | | | |
|---|---|---|---|
| 9,947,412 B1 | 4/2018 | Hu | |
| 10,854,290 B1 | 12/2020 | Wu et al. | |
| 2012/0144097 A1* | 6/2012 | Hashimoto | G06F 3/0608 |
| | | | 711/E12.008 |
| 2017/0371559 A1* | 12/2017 | Higgins | G06F 3/0611 |
| 2020/0065018 A1* | 2/2020 | Hong | G06F 3/0679 |

(Continued)

FOREIGN PATENT DOCUMENTS

| | | |
|---|---|---|
| CN | 104572478 A | 4/2015 |
| CN | 111241002 A | 6/2020 |

(Continued)

OTHER PUBLICATIONS

Office Action in Chinese Appln. No. 202311105073.2, mailed on Aug. 29, 2025, 17 pages (with English translation).

(Continued)

*Primary Examiner* — Shawn X Gu
(74) *Attorney, Agent, or Firm* — Fish & Richardson P.C.

(57)          ABSTRACT

Examples of the present application disclose memory systems, operation methods, and electronic apparatuses, and relate to, but are not limited to, the technical field of semiconductors. In an example, a memory system includes a memory and a controller that are coupled, wherein the memory includes a first storage space and a second storage space, and an access rate of the first storage space is greater than an access rate of the second storage space. The controller is configured to: control the memory to write first data in the second storage space to the first storage space, wherein the first data is hot data stored in the second storage space.

19 Claims, 10 Drawing Sheets

(56) References Cited

U.S. PATENT DOCUMENTS

| | | | |
|---|---|---|---|
| 2024/0094932 A1* | 3/2024 | Kantani | G06F 3/0644 |
| 2024/0256440 A1* | 8/2024 | Pletka | G06F 3/0653 |

FOREIGN PATENT DOCUMENTS

| | | |
|---|---|---|
| CN | 111506262 A | 8/2020 |
| CN | 112506875 A | 3/2021 |
| CN | 116136742 A | 5/2023 |
| CN | 116149564 A | 5/2023 |

OTHER PUBLICATIONS

Office Action in Chinese Appln. No. 202311105073.2, mailed on Dec. 22, 2025, 15 pages (with English translation).

* cited by examiner

MEMORY SYSTEM, OPERATION METHOD, AND ELECTRONIC APPARATUS

CROSS-REFERENCE TO RELATED APPLICATIONS

This application claims priority to Chinese Patent Application No. 202311105073.2, filed on Aug. 29, 2023, which is hereby incorporated by reference in its entirety.

TECHNICAL FIELD

Examples of the present application relate to, but are not limited to, the technical field of semiconductors, and particularly to a memory system, an operation method, and an electronic apparatus.

BACKGROUND

With the development of a flash memory, the number of bits of a memory cell increases from 1 bit to 2 bits, 3 bits, and 4 bits. Accordingly, the memory cell evolves from a single level cell (SLC) to a multiple level cell (MLC), a triple level cell (TLC), and a quad-level cell (QLC). Accordingly, the number of memory states in the memory increases from 2 to 4, 8, and 16.

SUMMARY

The present application provides a memory system, an operation method, and an electronic apparatus.

In a first aspect, a memory system is provided, which comprises a memory and a controller. The memory comprises a first storage space and a second storage space, wherein an access rate of the first storage space is greater than an access rate of the second storage space. The controller is coupled with the memory and configured to control the memory to write first data in the second storage space to the first storage space, wherein the first data is hot data stored in the second storage space.

In a possible implementation of the first aspect, the controller is further configured to: determine the first data as the hot data according to a read frequency of the first data in the second storage space In a possible implementation of the first aspect, the controller is further configured to: when an available space capacity of the first storage space is less than a designated capacity, control the memory to write data in the first storage space with a read frequency less than a designated frequency to the second storage space.

In a possible implementation of the first aspect, the first data is data of a designated data type.

In a possible implementation of the first aspect, the controller is further configured to detect a read frequency of data in the second storage space with a preset number of logical block addresses as a unit, so as to determine the first data.

In a possible implementation of the first aspect, the first storage space comprises a first storage region used for storing the hot data from the second storage space.

In a possible implementation of the first aspect, the first storage space corresponds to a plurality of first memory cells, the second storage space corresponds to a plurality of second memory cells, and the number of bits stored in the first memory cells is less than the number of bits stored in the second memory cells.

In a possible implementation of the first aspect, the controller is further configured to allocate an available physical memory block to the first storage space when an available space capacity of the first storage space is less than a designated capacity.

In a possible implementation of the first aspect, after writing the first data in the second storage space to the first storage space, the controller is configured to control the memory to erase the first data in the second storage space.

In a possible implementation of the first aspect, the controller is further configured to receive a read command for the first data in the second storage space from a host; and record the number of read times, time for reading, or a read frequency of the first data in response to the read command.

In a second aspect, an operation method of a memory system is provided, which comprises: determining first data stored in a second storage space as hot data; and writing the first data stored in the second storage space to a first storage space, wherein an access rate of the first storage space is greater than an access rate of the second storage space.

In a possible implementation of the second aspect, the method further comprises: determining the first data as the hot data according to a read frequency of the first data in the second storage space.

In a possible implementation of the second aspect, the method further comprises: when an available space capacity of the first storage space is less than a designated capacity, controlling a memory to write data in the first storage space with a read frequency less than a designated frequency to the second storage space.

In a possible implementation of the second aspect, the first data is data of a designated data type.

In a possible implementation of the second aspect, the method further comprises: detecting a read frequency of data in the second storage space with a preset number of logical block addresses as a unit, so as to determine the first data.

In a possible implementation of the second aspect, the first storage space comprises a first storage region used for storing the hot data from the second storage space.

In a possible implementation of the second aspect, the first storage space corresponds to a plurality of first memory cells, the second storage space corresponds to a plurality of second memory cells, and the number of bits stored in the first memory cells is less than the number of bits stored in the second memory cells.

In a possible implementation of the second aspect, the method further comprises: allocating an available physical memory block to the first storage space when an available space capacity of the first storage space is less than a designated capacity.

In a possible implementation of the second aspect, after writing the first data stored in the second storage space to the first storage space, the method further comprises: erasing the first data in the second storage space.

In a possible implementation of the second aspect, the method further comprises: receiving a read command for the first data in the second storage space from a host; and recording the number of read times, time for reading, or a read frequency of the first data in response to the read command.

In a third aspect, an electronic apparatus is provided, which comprises a processor and the memory system provided by the first aspect or any possible implementation of the first aspect.

In a fourth aspect, a computer readable storage medium is provided, which stores a program code that is callable by a processor to execute the operation method of the memory system provided by the second aspect or any possible implementation of the second aspect.

In yet another aspect of the present application, a computer program product is provided, which, when running on a computer, causes the computer to execute the operation method of the memory system provided by the second aspect or any possible implementation of the second aspect.

DETAILED DESCRIPTION

The technical solutions in some examples of the present application will be described below clearly and completely in conjunction with the drawings. Apparently, the examples described are only part of, but not all of, the examples of the present application. All other examples obtained by those of ordinary skill in the art based on the examples provided by the present application shall fall in the scope of protection of the present application.

In the description of the present application, the terms "first" and "second" are only for the purpose of description, and cannot be construed as indicating or implying relative importance or implicitly indicating the number of indicated technical features. Thus, features defined by "first" and "second" may explicitly or implicitly include one or more of such features. In the description of the examples of the present application, "a plurality of" means two or more, unless otherwise stated.

When describing some examples, the term "couple" may be used to indicate that two or more components are in direct physical contact or electrical contact. However, the term "couple" may also mean that two or more components are not in direct contact with each other, but they still cooperate or interact with each other. The examples disclosed herein are not necessarily limited to the content herein.

"At least one of A, B and C" and "at least one of A, B or C" have the same meaning, both including the following combinations of A, B and C: A alone, B along, C alone, a combination of A and B, a combination of A and C, a combination of B and C, and a combination of A, B and C. "A and/or B" includes the following three combinations: A alone, B alone, and a combination of A and B. The use of "suitable for" or "configured to" herein means open and inclusive language, and does not exclude an apparatus suitable for performing or configured to perform additional tasks or steps.

Before introducing the examples of the present application, application scenarios for the examples of the present application are introduced first. The technical solutions provided by the present application may be applied in an electronic apparatus, or may be applied in constituent parts of an electronic apparatus (such as a chip embedded in the electronic apparatus). The electronic apparatus includes, but is not limited to, a mobile phone, a tablet computer, a computer, a notebook computer, a video camera, a camera, a wearable apparatus, a vehicle-mounted apparatus or a terminal apparatus, etc.

Figure 1:
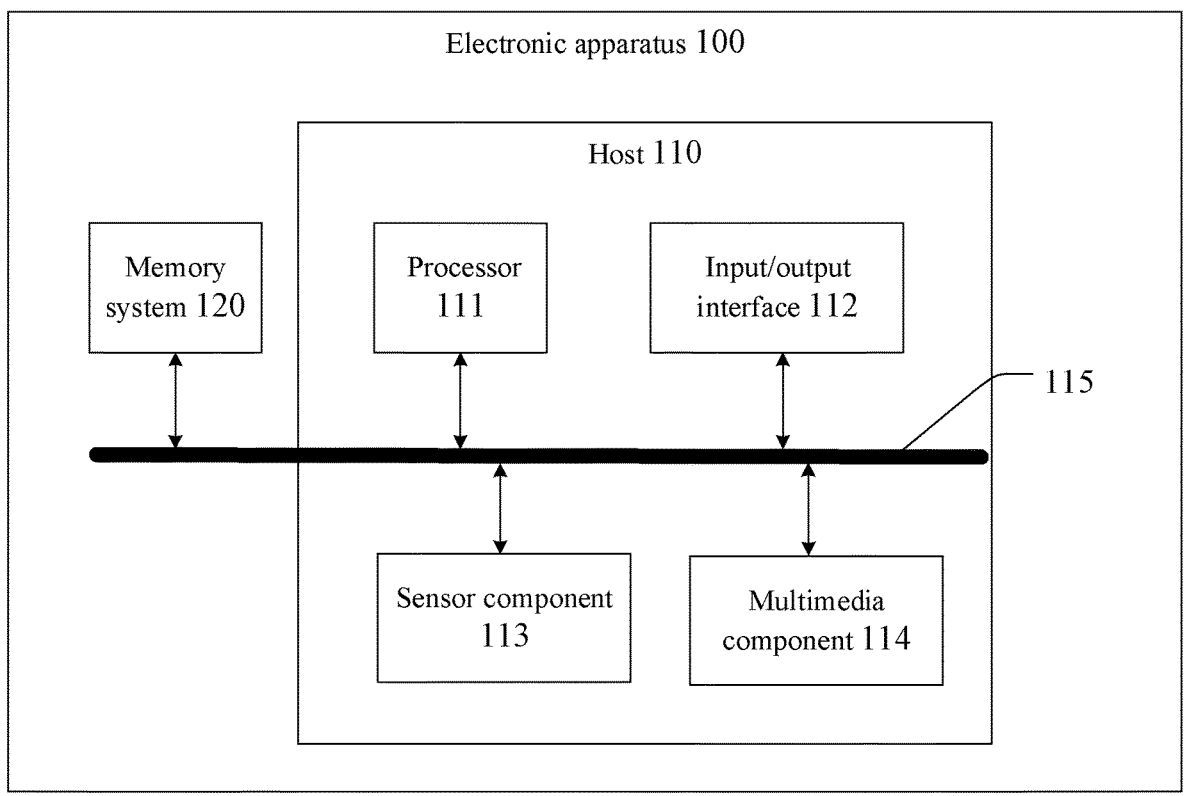
FIG. 1 is a schematic structural diagram of an electronic apparatus provided by examples of the present application.

FIG. 1 is a schematic structural diagram of an electronic apparatus provided by examples of the present application. The electronic apparatus 100 may comprise a memory system 120 and a host 110. The host 110 may comprise: a processor 111, an input/output interface 112, a sensor component 113, and a multimedia component 114, etc. The memory system 120, the processor 111, the input/output interface 112, the sensor component 113, and multimedia component 114 may be coupled respectively through a bus 115.

The memory system 120 may be used to store data, a software program, and a module, and mainly comprises a program storage region and a data storage region. The program storage region can store a software program, including an instruction formed from a code, including but not limited to an operating system, and applications required by at least one function. The data storage region can store data created according to the use of the electronic apparatus 100. In some feasible examples, the memory system 120 may comprise one memory or a plurality of memories. The memory may include a floppy disc, a hard disc such as a built-in hard disc or mobile hard disc, a magnetic disc, an optical disc, a magneto-optical disc such as a Compact Disc Read-Only Memory (CD-ROM), a non-volatile storage apparatus such as a Random Access Memory (RAM), a Read-Only Memory (ROM), a Programmable Read Only Memory (PROM), an Electrical Programmable Read Only Memory (EPROM), an Electrically Erasable Programmable Read-Only Memory (EEPROM), a flash memory, or a storage medium of any other form commonly known in the technical field.

The processor 111 is a control center of the electronic apparatus 100, which connects all parts of the entire apparatus using various interfaces and wires, and executes various functions of and processes data of the electronic apparatus 100 by running or executing software programs and/or software modules stored in the memory and calling data stored in the memory, thereby performing overall monitoring on electronic apparatus 100. In some feasible examples, the processor 111 may be a single processor 111 structure, a multiple processors 111 structure, a single-thread processor 111 or a multi-thread processor 111, etc. In some feasible examples, the processor 111 may include at least one of a central processor 111 unit, a general-purpose processor 111, a digital signal processor 111, a neural network processor 111, a graphics processing unit (GPU), an image signal processor 111, a microcontroller or microprocessor 111, etc. In addition, the processor 111 may further include other hardware circuits or accelerators, such as an application-specific integrated circuit, a field programmable gate array, or other programmable logic devices, transistor logic devices, hardware components, or any combination thereof.

The processor 111 can implement or execute various example logical blocks, modules, and circuits described in conjunction with the disclosure of the present application. The processor 111 may also include a combination that achieves a computing function, such as a combination comprising one or more microprocessors 111, or a combination of a digital signal processor 111 and a microprocessor 111, etc.

The sensor component 113 comprises one or more sensors used for providing state evaluation in various aspects for the electronic apparatus 100. The sensor component 113 may include an optical sensor, an acceleration sensor, a gyroscope sensor, a magnetic sensor, a pressure sensor, or a temperature sensor. A surrounding image, acceleration/deceleration, an orientation, or an on/off state of the electronic apparatus 100, relative positioning of the component, or a temperature variation of the electronic apparatus 100 may be detected by the sensor component 113.

The multimedia component 114 provides a screen with an output interface between the electronic apparatus 100 and a user. When the screen is a touch panel, the screen may be implemented as a touch screen to receive an input signal from the user. The touch panel comprises one or more touch sensors to sense a touch, a slide, and a gesture on the touch panel. The touch sensor can not only sense a boundary of a touch or slide action, but also detect duration and pressure associated with a touch or slide operation.

The input/output interface 112 provides an interface between the processor 111 and a peripheral interface module which, for example, may include a keyboard, a mouse, or a universal serial bus (USB 115) apparatus, etc. In a possible implementation, there may be only one or more input/output interfaces 112.

In some examples, the electronic apparatus 100 may further comprise an audio component and a communication component, etc. For example, the audio component includes a microphone, and the communication component includes a Wireless Fidelity (WiFi) module or a Bluetooth module, etc. The examples of the present application are no longer repeated here.

Figure 2:
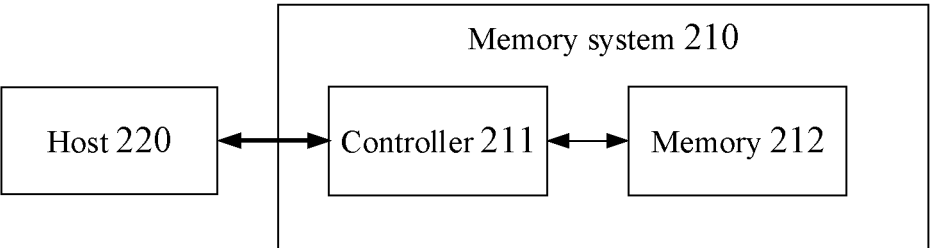
FIG. 2 is a schematic structural diagram of a memory system provided by examples of the present application.

Next, the memory system in the electronic apparatus is introduced. FIG. 2 is a schematic structural diagram of a memory system provided by examples of the present application. The memory system 210 may comprise a memory 212 and a controller 211 that are coupled. The memory 212 may include a floppy disc, a hard disc such as a built-in hard disc or mobile hard disc, a magnetic disc, an optical disc, a magneto-optical disc such as a Compact Disc Read-Only Memory (CD-ROM), a non-volatile storage apparatus such as a Random Access Memory (RAM), a read-only memory (ROM), a Programmable Read Only Memory (PROM), an Electrical Programmable Read Only Memory (EPROM), an Electrically Erasable Programmable Read-Only Memory (EEPROM), a flash memory (such as a NAND flash memory), or a storage medium of any other form commonly known in the technical field. The controller 211 may be coupled with a host 220. The controller 211 may receive an operation command from the host 220 and send a command (CMD), an address (ADD), and data to the memory 212 according to the operation command. The memory 212 may receive the address sent by the controller 211, and perform an operation of a corresponding command on a region selected according to the address.

In an example, there may be one or more the memories 212, and the memories 212 and the controller 211 may be integrated on the same chip or disposed on different chips respectively.

In an example, the controller 211 and a single memory 212 may be integrated into a memory card. The memory card may include a Personal Computer Memory Card International Association (PCMCIA) card, a Compact Flash (CF) card, a Smart Media (SM) card, a Memory Stick, a Multimedia Card (MMC), a Secure Digital (SD) card, a Universal Flash Storage (UFS), etc. The multimedia card may be divided into an MMC, a reduced-size MMC (RS-MMC), a micro MMC (MMCmicro), etc. The Secure Digital card includes an SD, a mini SD (miniSD), a micro SD (microSD), a high capacity Secure Digital card (SDHC), etc. Further, the memory card may also comprise a memory card connector coupling the memory card with the host 220.

In another example, the controller 211 and a plurality of memories 212 may be integrated into a Solid State Disk (SSD). The SSD may further comprise an SSD connector coupling the SSD with the host 220. In some implementations, a memory capacity of the SSD is greater than a memory capacity of the memory card, and/or an operating speed of the SSD is greater than an operating speed of the memory card.

Figure 3:
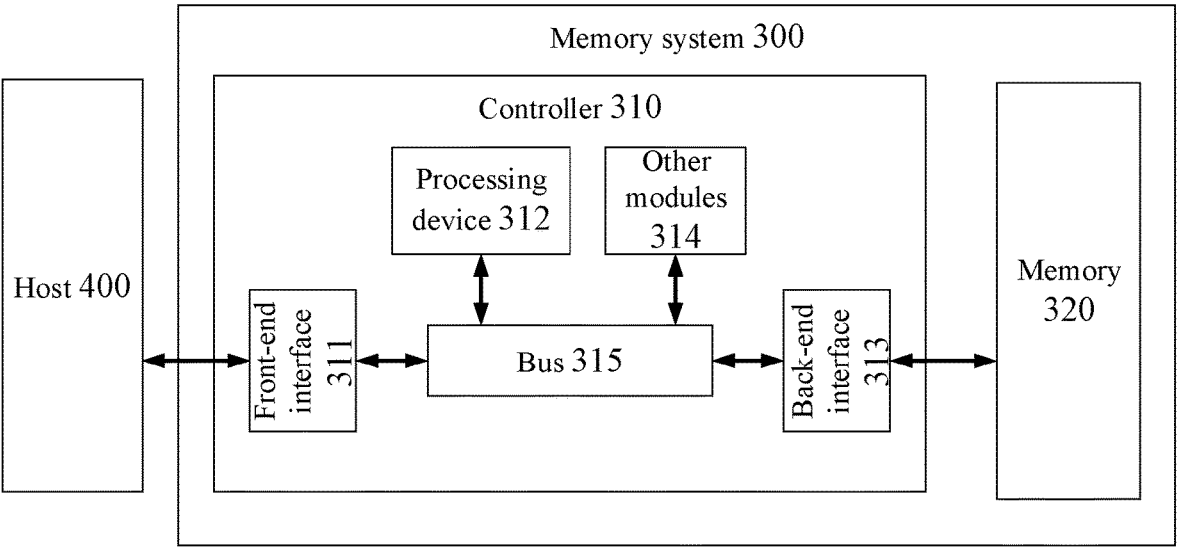
FIG. 3 is a schematic structural diagram of a controller provided by examples of the present application.

A possible structure of a controller 310 in a memory system 300 is introduced through FIG. 3. The controller 310 may comprise: a front-end interface 311, a processing device 312, a back-end interface 313, and other modules 314, wherein the front-end interface 311, the processing device 312, the back-end interface 313, and the other modules 314 may be coupled respectively through a bus 315. In an example, the bus 315 may be an Advanced Extensible Interface (AXI) bus 315. The other modules 314 may include a write buffer, a read buffer, an Error Correcting Code (ECC) module, a Wear Leveling (WL) module, a Garbage Collection (GC) module, etc. The controller 310 may be coupled with a host 400 through the front-end interface 311 and coupled with a memory 320 through the back-end interface 313. The controller 310 can control a general operation of the memory 320 in response to a request received from the host 400.

Figure 4:
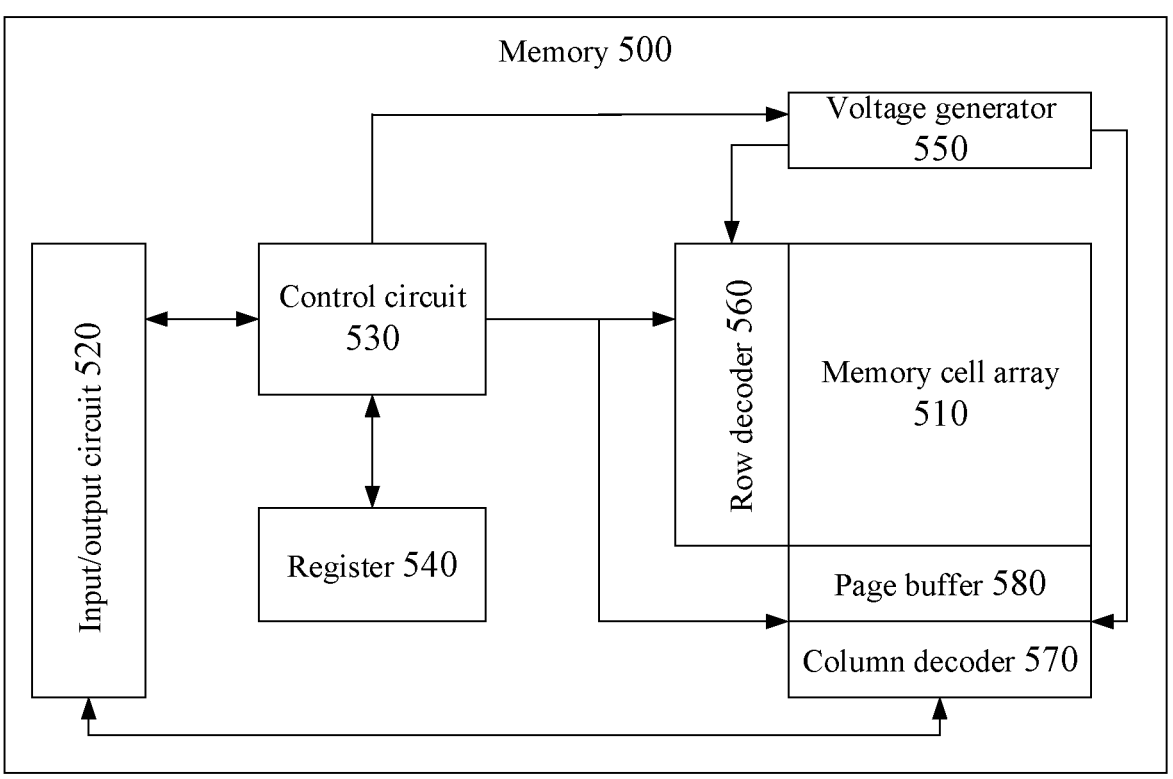
FIG. 4 is a schematic structural diagram of a memory provided by examples of the present application.

The memory provided by the examples of the present application includes, but is not limited to, a NAND flash memory. The examples of the present application take the memory being the NAND flash memory as an example for illustration. Referring to FIG. 4, a memory 500 may comprise a memory cell array 510, an input/output circuit 520, a control circuit 530, a register 540, a voltage generator 550, a row decoder 560, a column decoder 570, a page buffer 580, etc., wherein circuits other than the memory cell array 510, such as the input/output circuit 520, the control circuit 530, the register 540, the voltage generator 550, the row decoder 560, the column decoder 570, and the page buffer 580, etc., may be referred to as peripheral circuits.

Figure 5:
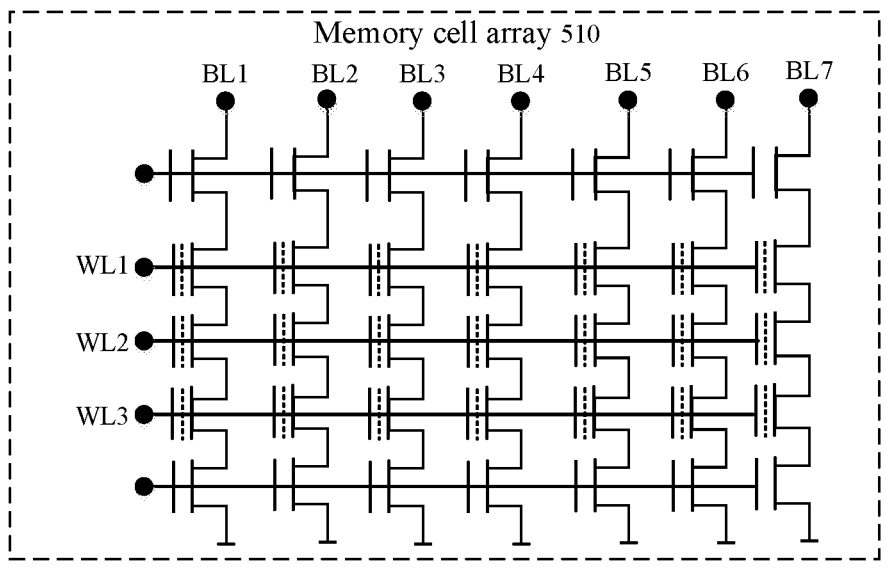
FIG. 5 is a schematic structural diagram of a memory cell array provided by examples of the present application.

The memory cell array 510 may comprise a plurality of memory cells, a plurality of bit lines (BLs), and a plurality of word lines (WLs). Each memory cell is coupled with one of the word lines and one of the bit lines. When data is to be read from a selected memory cell, a read voltage may be applied to a word line coupled with the selected memory cell, and a pass voltage is applied to a word line coupled with an unselected memory cell. FIG. 5 shows a possible structural schematic diagram of the memory cell array 510. The plurality of bit lines of the memory cell array 510 may include BL1, BL2, BL3, BL4, BL5, BL6, and BL7, etc., and the plurality of word lines of the memory cell array 510 may include WL1, WL2, and WL3, etc.

The input/output circuit 520 is mainly used to receive a read instruction and a write instruction sent by a controller, and send the read data to the controller, etc. The input/output circuit 520 may be coupled to the control circuit 530, and act as a control buffer to buffer and relay a control command received from a host to the control circuit 530 and to buffer and relay state information received from the control circuit 530 to the host. The input/output circuit 520 may be also coupled to the column decoder 570 via a data bus and act as a data interface and a data buffer to buffer and relay the data to and from the memory cell array 510.

The control circuit 530 may be configured to control operations of the memory cell array 510 and the page buffer 580. The control circuit 530 is mainly used to control the row decoder 560 to turn on the voltage generator 550 and a corresponding word line according to the received read instruction, and to control the column decoder 570 to turn on the voltage generator 550 and a corresponding bit line to read the corresponding data.

The register 540 includes an address register 540, and a state register 540, etc. The address register 540 is used to store a word line address and a string address, etc. in a read request instruction. The state register 540 is used to store a current state of the memory 500, including both a ready state and a busy state. When the control circuit 530 is reading data from the memory cell array 510 or writing data to the memory cell array 510, the state stored by the state register 540 is the "busy" state, and a next read or write operation cannot be performed. When the memory cell array 510 finishes a read process or a write process, the state stored in the state register 540 is switched to the "ready" state, and a next read or write operation can be performed.

The voltage generator 550 may be configured to be controlled by the control circuit 530 and generate word line voltages (such as a read voltage, a write voltage, a pass voltage, a local voltage, a verify voltage, etc.), bit line voltages and source line voltages to be supplied to the memory cell array 510.

The row decoder 560 may be configured to be controlled by the control circuit 530 and select/deselect memory blocks of the memory cell array 510 and select/deselect word lines of the memory blocks. The row decoder 560 may be further configured to drive the word lines using word line voltages generated from the voltage generator 550. In some implementations, the row decoder 560 may also select/deselect and drive source select gate lines and drain select gate lines. For example, the row decoder 560 is configured to perform an erase operation on the memory cells coupled to (one or more) selected word lines.

The column decoder 570 may be configured to be controlled by the control circuit 530 and select one or more memory strings by applying bit line voltages generated from the voltage generator 550.

The page buffer 580 may be configured to read data from or write (or program) data to the memory cell array 510 according to a control signal from the control circuit 530. In an example, the page buffer 580 may store one page of write data (program data) to be programmed into one memory page of the memory cell array 510. In another example, the page buffer 580 may perform a program verification operation to ensure that the data has been properly programmed into the memory cells coupled to the selected word lines. In yet another example, the page buffer 580 may also sense a low power signal from a bit line that represents a data bit stored in the memory cells, and amplify a small voltage swing to a recognizable logic level in the read operation.

Memory states of the memory are introduced after introducing the possible structure of the memory. With the development of the flash memory, the number of bits stored by a memory cell of the flash memory increases from 1 bit to 2 bits, 3 bits, 4 bits, and 5 bits. Accordingly, the memory cell of the flash memory evolves from a single level cell (SLC) to a multiple level cell (MLC), such as a double level cell (DLC), a triple level cell (TLC), a quad-level cell (QLC), and a penta-level cell (PLC), etc. Accordingly, the number of memory states in the flash memory increases from 2 to 4, 8, 16, and 32, etc.

Figure 6:
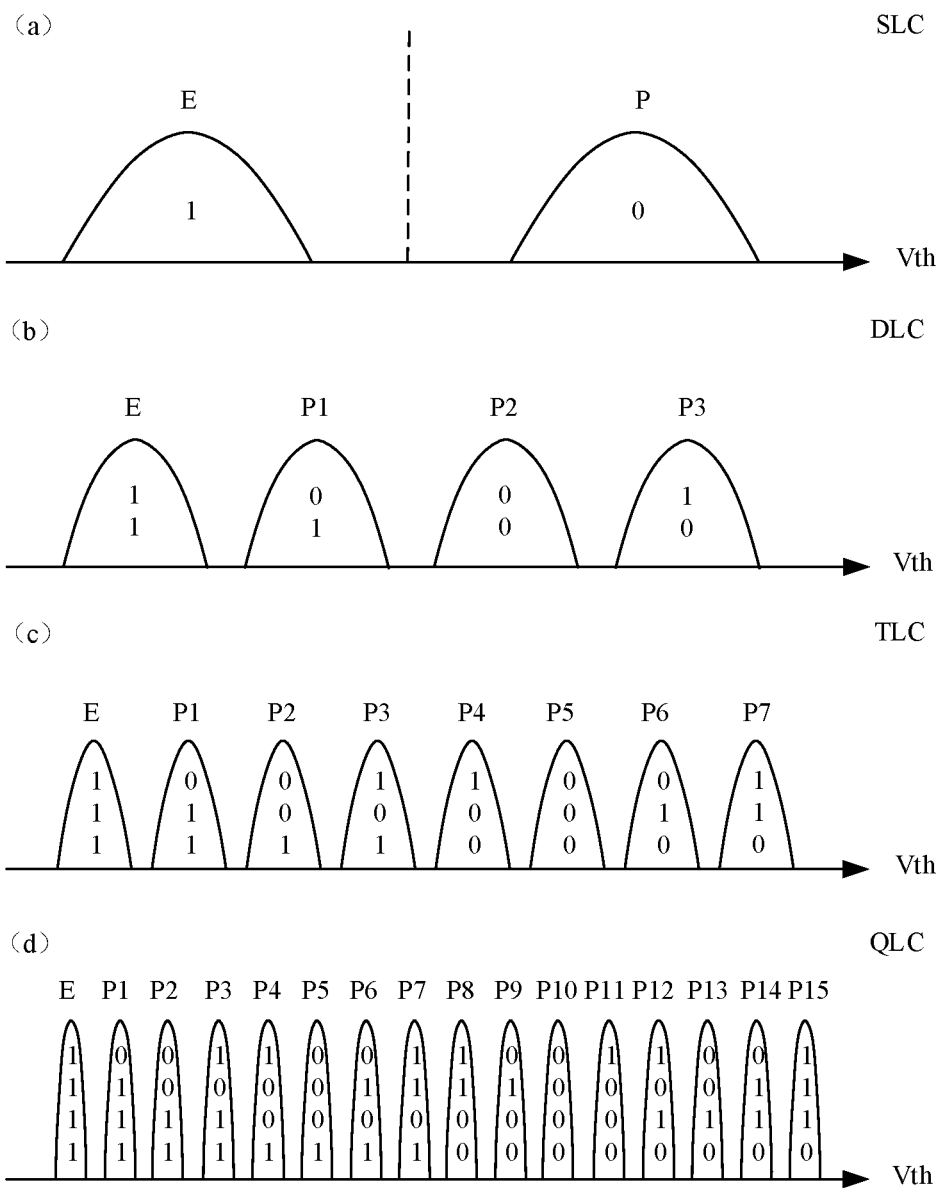
FIG. 6 is a schematic diagram of memory states of a memory provided by examples of the present application.

A memory mode of the flash memory corresponds to the number of bits stored in the memory cell thereof. For example, each memory cell of a flash memory in an SLC memory mode can store 1 bit of data; each memory cell of a flash memory in a DLC memory mode can store 2 bits of data; each memory cell of a flash memory in a TLC memory mode can store 3 bits of data; and each memory cell of a flash memory in a QLC memory mode can store 4 bits of data. Next, memory states corresponding to flash memories in different memory modes are introduced in conjunction with FIG. 6.

As shown in FIG. 6(a), memory states of the memory in the SLC memory mode include 1 erased state labeled as E, and 1 programmed state labeled as P. Vth represents a threshold voltage, and the threshold voltage of the programmed state P is greater than the threshold voltage of the erased state E.

As shown in FIG. 6(b), memory states of the memory in the DLC memory mode include 1 erased state labeled as E, and 3 programmed states labeled as P1, P2 and P3 sequentially from a first state to a third state. The threshold voltage increases gradually from the P1 state to the P3 state.

As shown in FIG. 6(c), memory states of the memory in the TLC memory mode include 1 erased state labeled as E, and 7 programmed states labeled as P1, P2, P3, P4, P5, P6, and P7 sequentially from a first state to a seventh state. The threshold voltage increases gradually from the P1 state to the P7 state.

As shown in FIG. 6(d), memory states of the memory in the QLC memory mode include 1 erased state labeled as E, and 15 programmed states labeled as P1, P2, P3, P4, P5, P6, P7, P8, P9, P10, P11, P12, P13, P14, and P15 sequentially from a first state to a fifteenth state. The threshold voltage increases gradually from the P1 state to the P15 state.

As can be seen from the above examples, a memory with a fixed number of memory cells has a larger memory capacity and a lower cost when the number of bits stored in each memory cell is larger, but has more memory states and more complex voltage control, thus resulting in a slower write rate, a slower read rate, and a slower erase rate, and lower reliability.

In the present application, the memory system may comprise two types of storage spaces. For example, one is a storage space with a faster access rate, such as a storage space in the SLC memory mode, and the other one is a storage space with a slower access rate, such as an MLC storage space (e.g., a storage space in the DLC memory mode, a storage space in the TLC memory mode, a storage space in the QLC memory mode).

In an example, a data write process of the memory system may comprise: during writing of data, writing the data to the storage space with the faster access rate to render a write rate faster. When the storage space is in an idle state, the data is written from the storage space with the faster access rate to the storage space with the slower access rate, so as to avoid an insufficient capacity of the storage space with the faster access rate. As such, a write rate of a user and the memory capacity of the storage space with the faster access rate may both be dynamically given consideration to. However, when the data is written to the storage space with the slower access rate, there is a problem of a slow data read rate during reading of the data.

Figure 7:
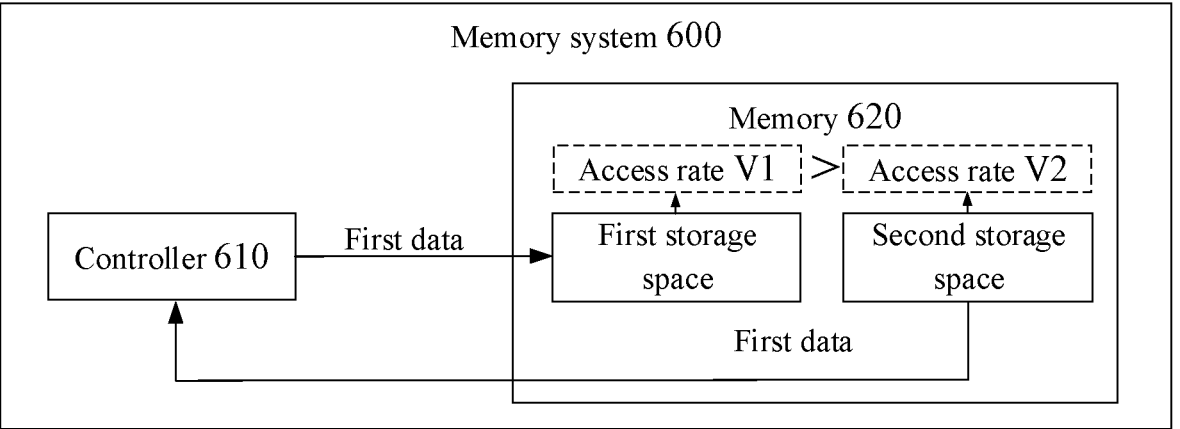
FIG. 7 is a schematic diagram of a memory system provided by examples of the present application.

Accordingly, in order to improve the problem of a slow data read speed, examples of the present application provide a system, which may be a memory system or a data processing system. The memory system is taken as an example for introduction and illustration below. FIG. 7 is a schematic diagram of a memory system provided by examples of the present application. The memory system 600 comprises: a memory 620 and a controller 610.

The memory 620 comprises a first storage space and a second storage space, wherein an access rate V1 of the first storage space is greater than an access rate V2 of the second storage space. The controller 610 is coupled with the memory 620 and configured to: control the memory 620 to write first data in the second storage space to the first storage space, wherein the first data is hot data stored in the second storage space.

In an example, a structure of the controller 610 may be referred to a structure of the controller 310 in FIG. 3, and a structure of the memory 620 may be referred to a structure of the memory 500 in FIG. 4.

Access may include at least one of reading or writing. An access rate of a storage space may include a rate of reading data from the storage space. In an example, if the rate of reading data from the storage space is directly proportional to a rate of writing data to the storage space, an access rate of the storage space may also include the rate of writing data to the storage space.

Further, the first storage space and the second storage space may correspond to the same memory or different memories. In an example, the memory 620 comprises a first memory and a second memory, wherein a storage space of the first memory is configured as the first storage space, and a storage space of the second memory is configured as the second storage space. The first memory may be a Spin-Transfer Torque-Magnetoresistive Random Access Memory (STT-MRAM), a NAND flash memory, or other memories, and the second memory may be a NAND flash memory or other memories. In another example, part of the storage space of the memory 620 is configured as the first storage space, and the other part of the space of the third memory 620 is configured as the second storage space. The memory 620 may be a NAND flash memory or other memory 620. The examples of the present application take that the first storage space and the second storage space can correspond to the same memory that is a NAND flash memory as an example for further illustration.

In a possible implementation, the controller 610 controls the memory 620 to write the first data in the second storage space to the first storage space. An example process may be as follows: the controller 610 sends a command CMD11 to the memory 620, wherein the CMD11 instructs the memory 620 to read the first data stored in the second storage space. The memory 620 reads the first data stored in the second storage space in response to the CMD11, and sends the first data to the controller 610. The controller 610 sends a command CMD12 to the memory 620, wherein the CMD12 instructs the memory 620 to write the first data to the first storage space. The memory 620 writes the first data to the first storage space in response to the CMD12.

In another possible implementation, before the controller 610 controls the memory 620 to write the first data in the second storage space to the first storage space, when an application or a user writes multiple pieces of data, the multiple pieces of data can be written to the first storage space first to ensure a fast write rate. Then the multiple pieces of data are written from the first storage space to the second storage space to avoid an insufficient capacity of the first storage space. Then the hot data (for example, the first data) of the multiple pieces of data is written to the first storage space. As such, the write rate and the memory capacity can both be dynamically given consideration to, while increasing a read rate of the hot data.

In the technical solution provided by the examples of the present application, the second storage space stores multiple pieces of data that may comprise the hot data, and the access rate of the second storage space is slower. The hot data (for example, the first data) in the second storage space is migrated to the first storage space with a faster access rate, and when a host coupled with the memory system reads the hot data, the hot data can be read from the first storage space with a faster access rate, rather than from the second storage space with a slower access rate. As such, a read rate of the hot data may be increased, access performance of an application is improved, and time for reading is reduced.

After the first data is written from the second storage space to the first storage space, the first data is stored in both the first storage space and the second storage space, and the first data stored in the second storage space causes a waste of a capacity of the second storage space. Therefore, the first data in the second storage space may be deleted to save the capacity of the second storage space. Next, deleting the first data in the second storage space are illustrated as an example through several possible implementations.

In a first possible implementation, if the first data is data that occupies an integer number of physical memory blocks, after writing the first data in the second storage space to the first storage space, the controller 610 may be further configured to: control the memory 620 to erase the first data in the second storage space.

An example process of controlling the memory 620 to erase the first data in the second storage space may be as follows: the controller 610 sends a command CMD13 to the memory 620, wherein the CMD13 instructs the memory 620 to erase the first data stored in the second storage space, and the memory 620 erases the first data in the second storage space in response to the CMD13.

In a second possible implementation, if the first data does not occupy an entire physical memory block, after writing the first data in the second storage space to the first storage space, the controller 610 may be further configured to: control the memory 620 to mark the first data stored in the second storage space as being invalid. As such, during a garbage collection operation performed on the physical memory block storing the first data in the second storage space, all data in the physical memory block is erased so as to erase the first data.

In a third possible implementation, if the first data does not occupy an entire physical memory block, after writing the first data in the second storage space to the first storage space, the controller 610 may be further configured to: control the memory 620 to mark the physical memory block storing the first data in the second storage space as an available memory block. As such, when the controller 610 controls the memory 620 to write new data to the available memory block, the memory 620 first performs erasing on the available memory block and then writes the new data to the available memory block, so as to erase the first data.

According to the above possible implementations, the first data in the second storage space may be deleted after the first data in the second storage space is written to the first storage space. As such, a capacity of the second storage space can be saved.

As can be seen from the above examples, the first storage space receives both data from the host (for example, new data to be written that is sent by the host to the memory system) and hot data from the first storage space (for example, hot data that has been written to the first storage space and is to be migrated to the second storage space). Storing the two types of data in a mixed manner causes inconvenience in management. Therefore, dedicated storage regions can be provided for the two types of data respectively to store the two types of data separately. In a possible implementation, the first storage space comprises a first storage region used for storing the hot data from the second storage space. The first storage space may further comprise a second storage region which is used for storing the data from the host. Different storage regions are disposed for the two types of data, and the two types of data are stored separately, so as to avoid too much hot data in the first storage space, which makes the capacity of the first storage space insufficient to store the new data from the host.

In the memory system provided by the examples of the present application, the first storage region is disposed in the first storage space to store the hot data from the second storage space, and the second storage region is disposed to store the data from the host, so that the hot data from the second storage space and other data (such as the data from the host) may be stored separately, thereby facilitating management.

How to determine that the first data is the hot data is introduced next. In a possible implementation, the controller 610 is further configured to: determine the first data as the hot data according to a read frequency of the first data in the second storage space.

The controller 610 may comprise a counting circuit. In an example, the counting circuit may be used to: record the number of read times of the first data within designated time. The read frequency of the first data being greater than or equal to a designated frequency may mean that: the number of read times is greater than or equal to a designated number of times.

In another example, the counting circuit may be used to: record time for the number of read times of the first data to reach the designated number of times. The read frequency of the first data being greater than or equal to the designated frequency may mean that: the time is less than or equal to designated time.

In another example, the counting circuit may be used to: record the number of read times and time for reading of the first data, and calculate a read frequency of the first data. The read frequency of the first data being greater than or equal to the designated frequency may mean that: the read frequency is greater than or equal to a designated frequency.

In a technical solution provided by the examples of the present application, a criterion for the first data being the hot data may be that: the read frequency of the first data is greater than or equal to the designated frequency. As such, data with a higher read frequency may be read from the first storage space with the faster access rate. Since read operations for the data with the higher read frequency account for a majority of all read operations, an overall data read rate may be improved, the access performance of an application is improved, and the time for reading is reduced.

In a possible implementation, the controller 610 is further configured to: detect a read frequency of data in the second storage space with a preset number of logical block addresses as a unit, so as to determine the first data.

The preset number of logical block addresses may be logical block addresses from 4 MB to 128 MB.

Further, detecting the read frequency of the data in the second storage space with the preset number of logical block addresses as a unit may be as follows: using multiple pieces of data of the preset number of logical block addresses as a data set (for example, 4 MB of data as a data set), and detecting a read frequency of each data set with a data set as a unit. The first data is a data set. Multiple pieces of data in a data set are data of consecutive logical block addresses.

In addition, the first data being the hot data may be that: a read frequency of any piece of data in the data set of the first data is greater than or equal to the designated frequency.

In the technical solution provided by the examples of the present application, the controller 610 may detect the read frequency of the data in the second storage space with the preset number of logical block addresses as a unit, so as to determine the first data. As such, on the one hand, the detection with the preset number of logical block addresses as a unit, instead of detection with a single logical block address as a unit, can determine the hot data with a larger granularity, thereby reducing computation times and improving firmware performance. On the other hand, unit division based on logical addresses can be aligned with commands of front-end components such as the host, thereby facilitating the unit division and determination of the first data.

In a possible implementation, the controller 610 is further configured to: receive a read command for the first data in the second storage space from the host; and record the number of read times, the time for reading, or the read frequency of the first data in response to the read command.

In an example, a read command sent by the host to the controller 610 may indicate reading multiple pieces of data in the second storage space. In response to the read command, the controller 610 records the number of read times, time for reading, or read frequency of the multiple pieces of data that may comprise the first data.

In the technical solution provided by the examples of the present application, the controller 610 records the number of read times, the time for reading, or the read frequency of the first data through the read command for the first data from a host side. As such, the read frequency of the first data in the second storage space may be obtained, and the first data is determined as the hot data according to the read frequency of the first data, thereby providing a basis for increasing the read rate of the hot data, improving the access performance of an application, and reducing the time for reading.

In another possible implementation, the first data is determined as the hot data according to a data type of the first data in the second storage space. In an example, the first data is data of a designated data type.

The data type may be a type of a file where the data is located. The data type of the first data may be determined according to a file suffix of the first data. The designated data type may be other data types than an image data type, a video data type, and a mirror image file data type, such as a text data type.

In an example, the memory system 600 can change the designated data type. For example, when an electronic apparatus is in a power saving mode, and the host does not access data such as image data and video data, the memory system 600 may set the designated data type to the text data type at this time. When a terminal exits a power saving mode and is in a normal mode, the host may access the image data and the video data. At this time, the memory system 600 may set other data types than the mirror image file data type to the designated data type.

In a possible implementation, the examples of the present application may also determine whether the first data is the hot data in combination with the data type and the data read frequency. For example, the controller 610 may be configured to: determine the first data as the hot data when the read frequency of the first data is greater than the designated frequency and the first data is the data of the designated data type. The criterion for the first data being the hot data is limited in terms of the data type and the read frequency, so as to avoid that excessive data is determined as the hot data and migrated from the second storage space to the first storage space, which leads to the insufficient capacity of the first storage space.

In the technical solution provided by the examples of the present application, the criterion for the first data being the hot data may be that: the first data is the data of the designated data type. As such, the data of the designated data type may be read from the first storage space with the faster access rate, so as to increase a read rate of the data of the designated data type, improve the access performance of an application, and reduce the time for reading.

The capacity of the first storage space may be insufficient if the first storage space receives both the data from the host and the hot data from the second storage space. Next, how to free the capacity of the first storage space is introduced by taking that the criterion for the first data being the hot data is that: the read frequency of the first data is greater than or equal to the designated frequency as an example.

In a possible implementation, the controller 610 is further configured to: when an available space capacity of the first storage space is less than a designated capacity, control the memory 620 to write data in the first storage space with a read frequency less than the designated frequency to the second storage space. The data with the read frequency less than the designated frequency may be data other than the hot data.

In an example, after the memory 620 is controlled to write the first data in the second storage space to the first storage space, when the available space capacity of the first storage space is less than the designated capacity and the read frequency of the first data is less than the designated frequency, the controller 610 sends a command CMD14 to the memory 620, wherein the CMD14 instructs the memory 620 to read the first data stored in the first storage space. The memory 620 reads the first data stored in the first storage space in response to the CMD14, and sends the first data to the controller 610. The controller 610 sends a CMD15 to the memory 620, wherein the CMD15 instructs the memory 620 to write the first data to the second storage space. The memory 620 writes the first data to the second storage space in response to the CMD15.

In another example, after controlling the memory 620 to write the data with the read frequency less than the designated frequency in the first storage space to the second storage space, the controller 610 may be further configured to: if the first data is data that occupies an integer number of physical memory blocks, control the memory 620 to erase the data with the read frequency less than the designated frequency in the first storage space. Alternatively, if the first data does not occupy an entire physical memory block, the memory 620 is controlled to mark the data stored in the first storage space with the read frequency less than the designated frequency as being invalid, or if the first data does not occupy an entire physical memory block, the memory 620 is controlled to mark the physical memory block in the first storage space storing the data with the read frequency less than the designated frequency as an available memory block.

In the technical solution provided by the examples of the present application, the data written from the second storage space to the first storage space is hot data right after the writing, but may no longer be hot data after a period of time. The capacity of the first storage space may be insufficient if the first storage space receives hot data from the second storage space continuously. When the available space capacity of the first storage space is less than the designated capacity, the data in the first storage space with the read frequency less than the designated frequency is written to the second storage space, so that data in the first storage space other than the hot data can be written to the second storage space, thereby saving the capacity of the first storage space.

Next, some differences between the first storage space and the second storage space are introduced. In a possible implementation, the first storage space corresponds to a plurality of first memory cells, the second storage space corresponds to a plurality of second memory cells, and the number of bits stored in the first memory cells is less than the number of bits stored in the second memory cells.

The first memory cells may be memory cells in physical memory blocks corresponding to the first storage space, and the second memory cells may be memory cells in physical memory blocks corresponding to the second storage space. For example, the memory 620 comprises a first physical memory block and a second physical memory block, with the first physical memory block allocated to the first storage space and the second physical memory block allocated to the second storage space. The first memory cells refer to memory cells of the first physical memory block, and the second memory cells refer to memory cells of the second physical memory block.

Furthermore, by configuring the first physical memory block as being in the memory mode of the first storage space (for example, the SLC memory mode) and the second physical memory block as being in the memory mode of the second storage space (for example, the QLC memory mode), the number of bits stored in the first memory cells is less than the number of bits stored in the second memory cells, so that the access rate of the first storage space is greater than the access rate of the second storage space. In an example, if the second memory cells are QLCs, then the first memory cells may be SLCs, DLCs, or TLCs.

In a technical solution provided by the examples of the present application, the number of bits stored in the first memory cells corresponding to the first storage space is less than the number of bits stored in the second memory cells corresponding to the second storage space. Memory states corresponding to the first storage space are fewer than memory states corresponding to the second storage space. Voltage control during data access of the memory cells corresponding to the first storage space is simpler. Therefore, the access rate of the first storage space is greater than the access rate of the second storage space. As such, a basis is provided for increasing a read rate of the hot data, improving the access performance of an application, and reducing the time for reading.

In a possible implementation, the memory cells in the physical memory block corresponding to the first storage space are used to store data of a fixed number of bits.

Regarding the physical memory block corresponding to the first storage space, it is possible that the memory 620 comprises a plurality of physical memory blocks, wherein the first storage space corresponds to a fixed physical memory block of the plurality of physical memory blocks, and memory cells of the fixed physical memory block are preset to store a fixed number of bits of data.

In an example, the first storage space may comprise a plurality of logical block addresses, and the controller 610 presets a mapping relationship between each logical block address and a physical block address, and stores the mapping relationship in the memory 620. Memory cells in the physical memory block indicated by the physical block address are used to store a fixed number of bits of data.

In an example, regarding the memory cells in the physical memory block corresponding to the first storage space being used to store a fixed number of bits of data, it is possible that the memory cells of the physical memory block corresponding to the first storage space only support storage of n bits of data or only support storage of m bits of data, i.e., the memory cells of the physical memory block cannot support storage of both n bits of data and m bits of data, wherein n is not equal to m. The first storage space is a static SLC storage space. For example, the memory mode of the physical memory block corresponding to the first memory space is preset as that: each memory cell is only used to store 1 bit of data.

In another possible implementation, the memory cells in the physical memory block corresponding to the first storage space are used to store a non-fixed number of bits of data.

Regarding the physical memory block corresponding to the first storage space, it is possible that the memory 620 comprises a plurality of physical memory blocks, wherein the physical memory block of the plurality of physical memory blocks corresponding to the first storage space is variable. During data writing, the controller 610 searches for a physical memory block that can be used to write the data according to the first storage space where the data is to be written, thereby determining that the physical memory block corresponds to the first storage space.

In an example, the first storage space may comprise a plurality of logical block addresses. When the controller 610 receives a data write command comprising a logical block address, the controller 610 allocates a physical block address to the logical block address, establishes a mapping relationship between the logical block address and the physical block address, and stores the mapping relationship in the memory 620. Memory cells in the physical memory block indicated by the physical block address are used to store a non-fixed number of bits of data.

In an example, regarding the memory cells in the physical memory block corresponding to the first storage space being used to store a non-fixed number of bits of data, it is possible that the memory cells of the physical memory block corresponding to the first storage space support storage of both n bits of data and m bits of data, wherein n is not equal to m. The first storage space is a dynamic SLC storage space. For example, memory cells of a physical memory block may be used to store 1 bit of data, 2 bits of data, and 3 bits of data. When the physical memory block is determined as the physical memory block corresponding to the first storage space, a memory mode of the physical memory block is set to that each memory cell stores 1 bit of data.

In another possible implementation, the memory cells in part of the physical memory block corresponding to the first storage space are used to store a fixed number of bits of data, while the memory cells in the other part of the physical memory block corresponding to the first storage space are used to store a non-fixed number of bits of data.

In further another possible implementation, the memory cells in the physical memory block corresponding to the second storage space may be used to store a fixed number of bits of data; or the memory cells in the physical memory block corresponding to the second storage space may be used to store a non-fixed number of bits of data; or the memory cells in part of the physical memory block corresponding to the second storage space are used to store a fixed number of bits of data, while the memory cells in the other part of the physical memory block corresponding to the second storage space are used to store a non-fixed number of bits of data. The corresponding description may be referred to the above description of the first storage space, and is no longer repeated here in the examples of the present application.

In a possible implementation, the controller 610 is further configured to: allocate an available physical memory block to the first storage space when an available space capacity of the first storage space is less than a designated capacity.

Regarding the available space capacity of the first storage space, it is possible that the first storage space corresponds to a capacity of a fixed physical memory block in the memory 620, wherein memory cells of the fixed physical memory block are used to store a fixed number of bits of data.

Furthermore, the available physical memory block may be: an available physical memory block with no data written thereto. Memory cells in the available physical memory block are used to store a non-fixed number of bits of data, and the number of bits of the data supported to be stored by the memory cells in the available physical memory block comprises the number of bits corresponding to the first storage space.

In an example, each memory cell of the available physical memory block may be used to store 1 bit, 2 bits, or 3 bits of data. The memory mode of the first storage space is the SLC memory mode. When the capacity of the fixed physical memory block corresponding to the first storage space is insufficient, the controller 610 sets the available physical memory block to the SLC memory mode and allocates it to the first storage space, thereby expanding the capacity of the first storage space.

In the technical solution provided by the examples of the present application, if the available space capacity of the first storage space is insufficient, the controller 610 allocates the available physical memory block to the first storage space. As such, a size of the first storage space may be dynamically adjusted to avoid an insufficient capacity of the first storage space.

After the introduction of the structure and function of the memory system provided by the examples of the present application, several possible interaction scenarios of the memory system are illustrated with examples.

Figure 8:
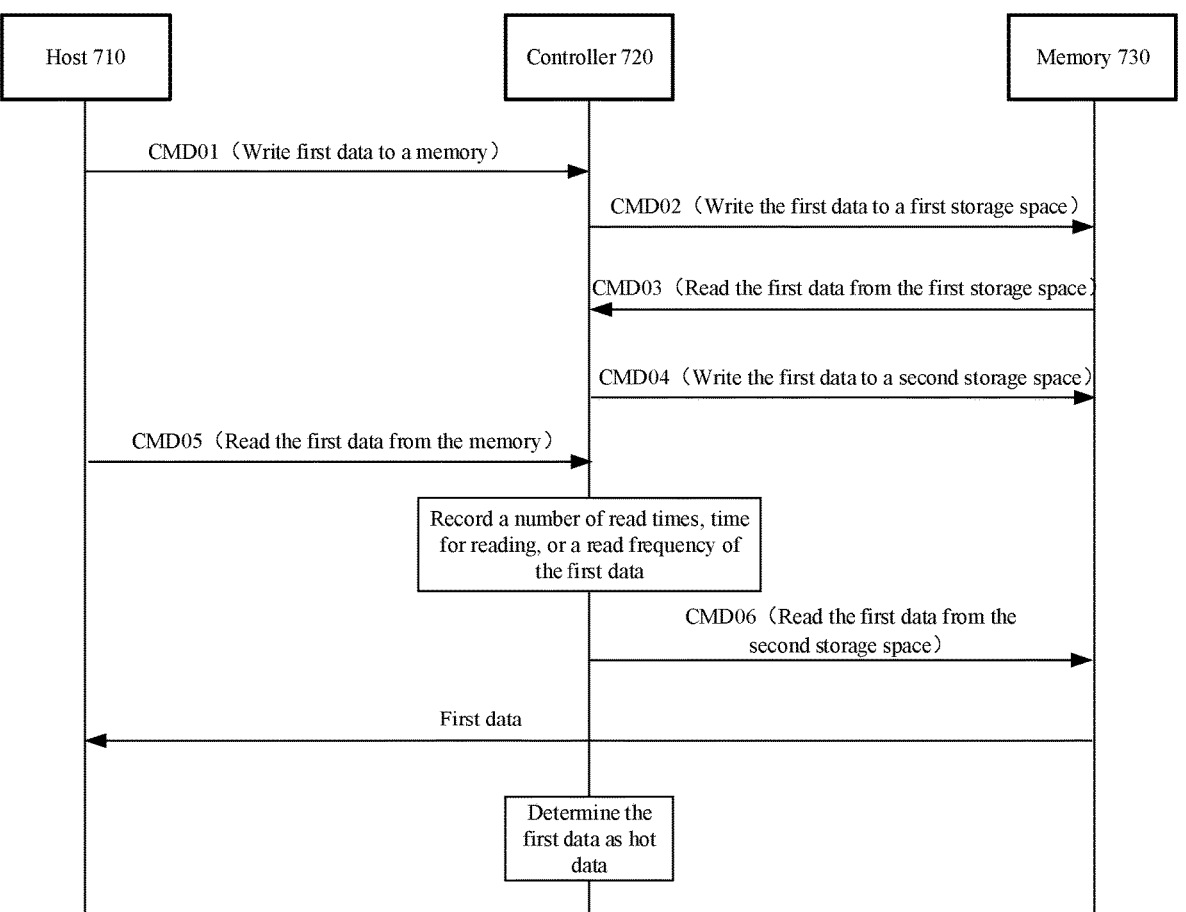
FIG. 8 is a first schematic interactive diagram of a memory system provided by examples of the present application.

FIG. 8 is a first schematic interactive diagram of a memory system provided by examples of the present application. The memory system is coupled with a host 710 and comprises a controller 720 and a memory 730. The host 710 can send a command CMD01 to the controller 720, wherein the CMD01 instructs writing of first data to the memory 730. The controller 720 sends a command CMD02 to the memory 730 in response to the CMD01, and the memory 730 writes the first data to a first storage space in response to the CMD02. As such, a user or an application can write the first data to the first storage space through the host 710 at a fast write rate.

When the memory system is in an idle state or at preset time, the memory system may be configured to perform the following operations: the controller 720 sends a command CMD03 to the memory 730, and the memory 730 reads the first data from the first storage space and sends the first data to the controller 720 in response to the CMD03. The controller 720 sends a command CMD04 to the memory 730, and the memory 730 writes the first data to a second storage space in response to the CMD04. As such, the first data may be migrated to the second storage space to save a capacity of the first storage space.

When the first data is to be read, the host 710 sends a command CMD05 to the controller 720, wherein the CMD05 instructs reading of the first data from the memory 730. The controller 720 sends CMD06 to the memory 730 in response to the CMD05, the memory 730 reads the first data from the second storage space and sends the first data to the controller 720 in response to the CMD06, and the controller 720 sends the first data to the host 710. Each time when receiving the CMD06 for the first data in the second storage space from the host 710, the controller 720 records the number of read times, time for reading, or a read frequency of the first data. The controller 720 determines the first data as hot data according to the number of read times, the time for reading, or the read frequency of the first data.

Figure 9:
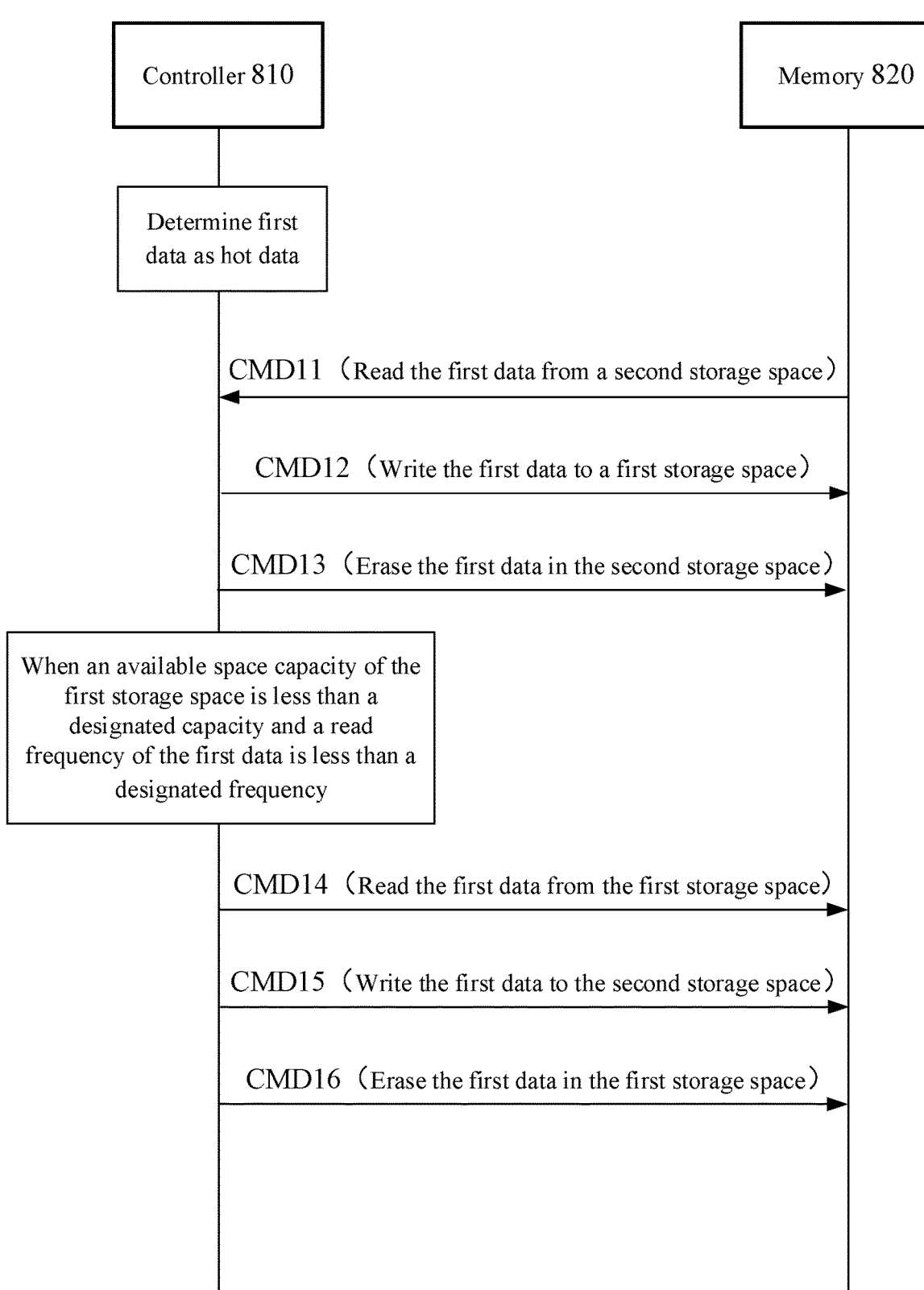
FIG. 9 is a second schematic interactive diagram of a memory system provided by examples of the present application.

FIG. 9 is a second schematic interactive diagram of a memory system provided by examples of the present application. The memory system comprises a memory 810 and a controller 820. After the controller 810 determines first data as hot data, the controller 810 sends a command CMD11 to the memory 820, and the memory 820 reads the first data from a second storage space and sends the first data to the controller 810 in response to the CMD11. The controller 810 sends a command CMD12 to the memory 820, and the memory 820 writes the first data to a first storage space in response to the CMD12. The controller 810 sends a command CMD13 to the memory 820, and the memory 820 erases the first data in the second storage space in response to the CMD13. As such, a read rate is faster when a user or an application reads the first data again.

When an available space capacity of the first storage space is less than a designated capacity and a read frequency of the first data is less than a designated frequency, the controller 810 sends a command CMD14 to the memory 820, and the memory 820 reads the first data from the first storage space and sends the first data to the controller 810 in response to the CMD14. The controller 810 sends a command CMD15 to the memory 820, and the memory 820 writes the first data to the second storage space in response to the CMD15. The controller 810 sends a command CMD16 to the memory 820, and the memory 820 erases the first data in the first storage space in response to the CMD16. As such, if the first data is no longer hot data, then the first data is migrated to the second storage space.

In an example, for data that is always in the first storage space, when the available space capacity of the first storage space is less than the designated capacity and the read frequency of the first data is less than the designated frequency, if the data is not hot data, the data may also be migrated to the second storage space.

Examples of the present application further provide a controller. The controller is coupled with a memory. The memory comprises a first storage space and a second storage space, wherein an access rate of the first storage space is greater than an access rate of the second storage space.

The controller is configured to: control the memory to write first data in the second storage space to the first storage space, wherein the first data is hot data stored in the second storage space.

In an example, the controller may be configured to: send a read command to the memory, wherein the read command instructs reading of the first data in the second storage space; receive the first data read from the second storage space from the memory; and send a write command to the memory, wherein the write command instructs writing of the first data read from the second storage space to the first storage space.

In a possible implementation, the controller is further configured to: determine the first data as the hot data according to a read frequency of the first data in the second storage space.

In a possible implementation, the controller is further configured to: when an available space capacity of the first storage space is less than a designated capacity, control the memory to write data in the first storage space with a read frequency less than the designated frequency to the second storage space.

In a possible implementation, the first data is data of a designated data type.

In a possible implementation, the controller is further configured to: detect a read frequency of data in the second storage space with a preset number of logical block addresses as a unit, so as to determine the first data.

In a possible implementation, the first storage space comprises a first storage region used for storing the hot data from the second storage space.

In a possible implementation, the first storage space corresponds to a plurality of first memory cells, the second storage space corresponds to a plurality of second memory cells, and the number of bits stored in the first memory cells is less than the number of bits stored in the second memory cells.

In a possible implementation, the controller is further configured to: allocate an available physical memory block to the first storage space when an available space capacity of the first storage space is less than a designated capacity.

In a possible implementation, after writing the first data in the second storage space to the first storage space, the controller is configured to: control the memory to erase the first data in the second storage space.

In a possible implementation, the controller is further configured to: receive a read command for the first data in the second storage space from a host; and record the number of read times, the time for reading, or the read frequency of the first data in response to the read command.

The relevant content of the controller provided by the examples of the present application may be referred to the relevant content of the controller in the above-mentioned memory system. The controller provided by the examples of the present application may achieve functions and effects of the above-mentioned memory system, which have been illustrated in the above memory system examples and thus are no longer repeated here in the examples of the present application.

Examples of the present application further provide a memory. The memory is coupled with a controller. The memory comprises a first storage space and a second storage space, wherein an access rate of the first storage space is greater than an access rate of the second storage space.

The memory is configured to: write first data in the second storage space to the first storage space, wherein the first data is hot data stored in the second storage space.

In an example, the memory may be further configured to: receive a read command from the controller, and send the first data read from the second storage space to the controller in response to the read command; and receive a write command from the controller, and write the first data read from the second storage space to the first storage space in response to the write command.

In a possible implementation, the memory is further configured to: when an available space capacity of the first storage space is less than a designated capacity, write data in the first storage space with a read frequency less than a designated frequency to the second storage space.

In a possible implementation, the first data is data of a designated data type.

In a possible implementation, the first storage space comprises a first storage region used for storing the hot data from the second storage space.

In a possible implementation, the first storage space corresponds to a plurality of first memory cells, the second storage space corresponds to a plurality of second memory cells, and the number of bits stored in the first memory cells is less than the number of bits stored in the second memory cells.

In a possible implementation, after writing the first data in the second storage space to the first storage space, the memory is configured to: erase the first data in the second storage space.

The relevant content of the memory provided by the examples of the present application may be referred to the relevant content of the memory in the above-mentioned memory system. The memory provided by the examples of the present application may achieve functions and effects of the above-mentioned memory system, which have been illustrated in the above memory system examples and thus are no longer repeated here in the examples of the present application.

Figure 10:
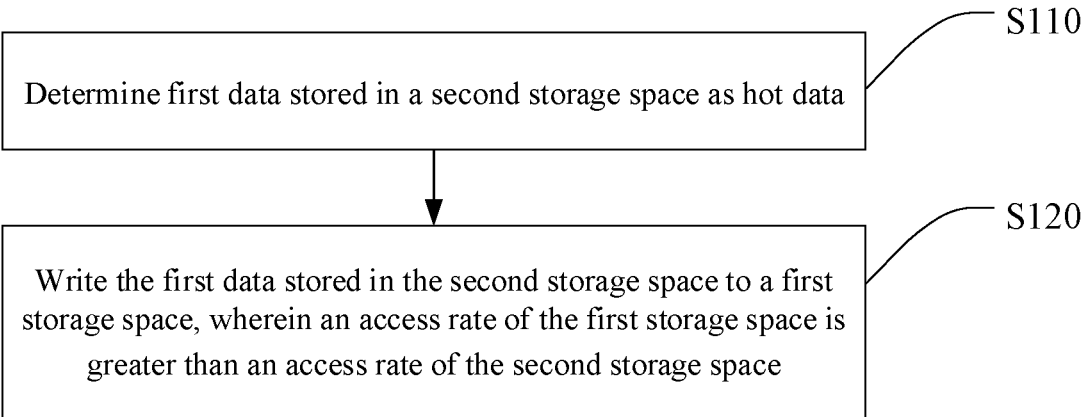
FIG. 10 is a flow diagram of an operation method of a memory system provided by examples of the present application.

Examples of the present application further provide a method, which may be an operation method of a memory system. FIG. 10 is a flow diagram of an operation method of a memory system provided by examples of the present application. The memory system may be the memory system 210 as shown in FIG. 2. The memory system comprises a memory and a controller that are coupled, wherein the memory comprises a first storage space and a second storage space, and an access rate of the first storage space is greater than an access rate of the second storage space. The method comprises:

S110: determining first data stored in the second storage space as hot data; and S120: writing the first data stored in the second storage space to the first storage space, wherein the access rate of the first storage space is greater than the access rate of the second storage space.

In the technical solution provided by the examples of the present application, the first data stored in the second storage space is determined as the hot data, and the first data stored in the storage space with the slower access rate is migrated to the storage space with the faster access rate, wherein the first data is the hot data. As such, a read rate of the hot data may be increased, access performance of an application is improved, and time for reading is reduced.

In a possible implementation, the method further comprises: determining the first data as the hot data according to a read frequency of the first data in the second storage space. In the technical solution provided by the examples of the present application, the first data is determined as the hot data according to the read frequency of the first data in the second storage space. As such, data with a higher read frequency may be read from the first storage space with the faster access rate. Since read operations for the data with the higher read frequency account for a majority of all read operations, an overall data read rate may be improved, the access performance of an application is improved, and the time for reading is reduced.

In a possible implementation, the method further comprises: when an available space capacity of the first storage space is less than a designated capacity, controlling the memory to write data in the first storage space with a read frequency less than a designated frequency to the second storage space. In the technical solution provided by the examples of the present application, the data in the first storage space with the read frequency less than the designated frequency is written to the second storage space when the available space capacity of the first storage space is less than the designated capacity. As such, data in the first storage space other than the hot data can be written to the second storage space, thereby saving the capacity of the first storage space.

In a possible implementation, the first data is data of a designated data type. In the technical solution provided by the examples of the present application, the first data is the data of the designated data type. As such, the data of the designated data type may be read from the first storage space with the faster access rate, so as to increase a read rate of the data of the designated data type, improve the access performance of an application, and reduce the time for reading.

In a possible implementation, the method further comprises: detecting a read frequency of data in the second storage space with a preset number of logical block addresses as a unit, so as to determine the first data. In the technical solution provided by the examples of the present application, the read frequency of the data in the second storage space is detected with the preset number of logical block addresses as a unit, so as to determine the first data. As such, on the one hand, the detection with the preset number of logical block addresses as a unit, instead of detection with a single logical block address as a unit, can determine the hot data with a larger granularity, thereby reducing computation times and improving firmware performance. On the other hand, unit division based on logical addresses can be aligned with commands of front-end components such as the host, thereby facilitating the unit division and determination of the first data.

In a possible implementation, the first storage space comprises a first storage region used for storing the hot data from the second storage space. In the technical solution provided by the examples of the present application, the dedicated first storage region is disposed in the first storage space to store the hot data from the second storage space, without interfering with the writing of other data (such as new data from the host), thereby giving consideration to both the write rate of the other data and the read rate of the hot data.

In a possible implementation, the first storage space corresponds to a plurality of first memory cells, the second storage space corresponds to a plurality of second memory cells, and the number of bits stored in the first memory cells is less than the number of bits stored in the second memory cells. In the technical solution provided by the examples of the present application, when the number of bits stored in the first memory cells corresponding to the first storage space is less than the number of bits stored in the second memory cells corresponding to the second storage space, the access rate of the first storage space is greater than the access rate of the second storage space. As such, a basis is provided for migrating the hot data stored in the storage space with the slower access rate to the storage space with the faster access rate, increasing a read rate of the hot data, improving the access performance of an application, and the reducing time for reading.

In a possible implementation, the method further comprises: allocating an available physical memory block to the first storage space when an available space capacity of the first storage space is less than a designated capacity. In the technical solution provided by the examples of the present application, if the available space capacity of the first storage space is insufficient, the controller allocates the available physical memory block to the first storage space. As such, a size of the first storage space may be dynamically adjusted to avoid an insufficient capacity of the first storage space.

In a possible implementation, after writing the first data stored in the second storage space to the first storage space, the method further comprises: erasing the first data in the second storage space. In the technical solution provided by the examples of the present application, after the first data stored in the second storage space is written to the first storage space, the second storage space still stores the first data, which occupies a capacity of the second storage space. The capacity of the second storage space can be saved by erasing the first data in the second storage space.

In a possible implementation, the method further comprises: receiving a read command for the first data in the second storage space from a host; and recording the number of read times, time for reading, or a read frequency of the first data in response to the read command. In the technical solution provided by the examples of the present application, the number of read times, the time for reading, or the read frequency of the first data is recorded through the read command for the first data from a host side. As such, a basis may be provided for increasing the read rate of the hot data, improving the access performance of an application, and reducing the time for reading.

Examples of the present application further provide an electronic apparatus, wherein a structure of the electronic apparatus may be referred to a structure of the electronic apparatus 100 in FIG. 1. The electronic apparatus may comprise a processor, a controller, and a memory. The controller and the memory may be used to support the electronic apparatus to execute at least one method operation in the above method examples.

In an example, the controller and the memory may be integrated as a memory system on a chip, with the processor coupled with the memory system.

In an example, the controller and the memory may be separately disposed on different chips, with the memory coupled with the controller and the controller coupled with the processor.

Examples of the present application also provide a computer readable storage medium which stores a program code therein, wherein the program code may be invoked by a processor to execute all or part of the operations of a method in the above method examples.

On the basis of such understanding, examples of the present application further provide a computer program product comprising instructions. The technical solution of the present application is essentially embodied in a form of a software product, or a portion contributing to the prior art, or all or part of the technical solution may be embodied in a form of a software product. The computer software product is stored in a storage medium, comprising several instructions to make a computer apparatus (which may be a personal computer, a server, or a network apparatus, etc.) or a memory system therein to execute part or all of the operations of a method in the method examples of the present application.

The electronic apparatus, the computer readable storage medium, and the computer program product provided by the examples of the present application may achieve functions and effects of the above-mentioned memory system, which has been illustrated in the above memory system examples and thus are no longer repeated here in the examples of the present application.

It is to be understood that, reference throughout the specification to "some examples" means that particular features, structures, or characteristics related to the examples are included in at least one example of the present disclosure. Thus, the appearances of the phrase "in some examples" or "in some other examples" in various places throughout this specification are not necessarily referring to the same example. Furthermore, these particular features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

It is to be noted that, the terms "comprise", "include" or any variants thereof herein are intended to cover nonexclusive inclusion, such that a process, a method, an article or a device comprising a series of elements comprise not only those elements, but also other elements not listed explicitly, or elements inherent to this process, method, article or device. An element defined by a statement "comprising one" do not preclude the presence of another identical element in the process, method, article or device comprising this element, without more limitations.

In several examples provided by the present disclosure, it should be understood that the disclosed apparatus and method may be implemented by other manners. The apparatus examples as described above are only illustrative, for example, the division of the units is only a logical functional division. In a real implementation, there may be another manner for division. For instance, a plurality of units or components may be combined, or may be integrated in another system, or some features can be omitted or not performed. In addition, the coupling or direct coupling or communication connection between various constituent parts as shown or as discussed may be implemented through indirect coupling or communication connection of some interfaces, apparatuses or units, and may be electrical, mechanical or other forms.

The above-mentioned units described as separate components may or may not be physically separated. The components shown as units may or may not be physical units. They may be located in one place, or may be distributed onto a plurality of network units. According to actual needs, part or all of the units may be selected for realizing the purposes of the solution of the example.

In addition, various functional units in each example of the present disclosure may be all integrated into one processing unit, or each unit may serve as one unit individually, or two or more units may be integrated into one unit. The above-mentioned integrated unit may be implemented in a hardware form or in a form of hardware and software functional units.

At last, it is to be noted that, the above description is merely detailed description of the present application, but the protection scope of the present application is not limited to these. Any variation or replacement within the technical scope as disclosed by the present application shall be encompassed within the protection scope of the present application. Therefore, the protection scope of the present application shall be subject to the protection scope of the claims.

What is claimed is:

1. A memory system of an electronic device, comprising:
a memory comprising a first storage space and a second storage space, wherein an access rate of the first storage space is greater than an access rate of the second storage space; and
a controller coupled with the memory and configured to:
    detect read frequencies of data sets in the second storage space by treating each of the data sets as a unit, wherein each of the data sets comprises multiple pieces of data of a preset number of logical block addresses;
    determine first data stored in the second storage space as hot data based on the read frequencies and determining that a data type of the first data is a designated data type, wherein the designated data type of the first data is determined based on whether the electronic device is in a power saving mode or a normal mode; and
    control the memory to write the first data in the second storage space to the first storage space for storing hot data from the second storage space.

2. The memory system of claim 1, wherein the controller is further configured to:
in response to determining that an available space capacity of the first storage space is less than a designated capacity, control the memory to write data in the first storage space with a read frequency less than a designated frequency to the second storage space.

3. The memory system of claim 1, wherein the first storage space comprises a first storage region for storing the hot data from the second storage space.

4. The memory system of claim 1, wherein the first storage space corresponds to a plurality of first memory cells, the second storage space corresponds to a plurality of second memory cells, and a number of bits stored in the first memory cells is less than a number of bits stored in the second memory cells.

5. The memory system of claim 4, wherein the controller is further configured to:
allocate an available physical memory block to the first storage space in response to determining that an available space capacity of the first storage space is less than a designated capacity.

6. The memory system of claim 1, wherein after writing the first data in the second storage space to the first storage space, the controller is configured to: control the memory to erase the first data in the second storage space.

7. The memory system of claim 1, wherein the controller is further configured to:
receive a read command for the first data in the second storage space from a host; and
record a number of read times, time for reading, and a read frequency of the first data in response to the read command.

8. An operation method of a memory system of an electronic device, comprising:
detecting read frequencies of a data set in a second storage space by treating multiple pieces of data of a preset number of logical block addresses comprised in the data set as a unit;
determining first data stored in the second storage space as hot data based on the read frequencies and determining that a data type of the first data is a designated data type, wherein the designated data type of the first data is determined based on whether the electronic device is in a power saving mode or a normal mode; and
writing the first data stored in the second storage space to a first storage space, wherein an access rate of the first storage space is greater than an access rate of the second storage space.

9. The method of claim 8, further comprising:
determining the first data as the hot data according to a read frequency of the first data in the second storage space.

10. The method of claim 9, further comprising:
in response to determining that an available space capacity of the first storage space is less than a designated capacity, writing data in the first storage space with a read frequency less than a designated frequency to the second storage space.

11. The method of claim 8, further comprising:
detecting a read frequency of data in the second storage space with a preset number of logical block addresses as a unit, so as to determine the first data.

12. The method of claim 8, wherein the first storage space corresponds to a plurality of first memory cells, the second storage space corresponds to a plurality of second memory cells, and a number of bits stored in the first memory cells is less than a number of bits stored in the second memory cells.

13. The method of claim 12, further comprising:
allocating an available physical memory block to the first storage space in response to determining that an available space capacity of the first storage space is less than a designated capacity.

14. The method of claim 8, further comprising:
after writing the first data stored in the second storage space to the first storage space, erasing the first data in the second storage space.

15. The method of claim 8, further comprising:
receiving a read command for the first data in the second storage space from a host; and
recording a number of read times, time for reading, or a read frequency of the first data in response to the read command.

16. An electronic apparatus comprising:
at least one processor; and
a memory system comprising:
    a memory comprising a first storage space and a second storage space, wherein an access rate of the first storage space is greater than an access rate of the second storage space; and
    a controller coupled with the memory and configured to:
        detect read frequencies of data sets in the second storage space by treating each of the data sets as a unit, wherein each of the data sets comprises multiple pieces of data of a preset number of logical block addresses;

determine first data stored in the second storage space as hot data based on the read frequencies and determining that a data type of the first data is a designated data type, wherein the designated data type of the first data is determined based on whether the electronic apparatus is in a power saving mode or a normal mode; and control the memory to write the first data in the second storage space to the first storage space for storing hot data from the second storage space.

17. The electronic apparatus of claim 16, wherein the controller is further configured to:

in response to determining that an available space capacity of the first storage space is less than a designated capacity, control the memory to write data in the first storage space with a read frequency less than a designated frequency to the second storage space.

18. The electronic apparatus of claim 16, wherein the first storage space comprises a first storage region for storing the hot data from the second storage space.

19. The electronic apparatus of claim 16, wherein the controller is further configured to:

receive a read command for the first data in the second storage space from a host; and record a number of read times, time for reading, and a read frequency of the first data in response to the read command.

\* \* \* \* \*